United States Patent [19]

Christian et al.

[11] 4,403,288
[45] Sep. 6, 1983

[54] METHODS AND APPARATUS FOR RESETTING PERIPHERAL DEVICES ADDRESSABLE AS A PLURALITY OF LOGICAL DEVICES

[75] Inventors: John H. Christian; Arthur H. Nolta; David G. Reed; Richard E. Rieck; Gerald E. Tayler; Terrell N. Truan; John S. Williams, all of Tucson, Ariz.

[73] Assignee: International Business Machines Corporation, Armonk, N.Y.

[21] Appl. No.: 306,011

[22] Filed: Sep. 28, 1981

[51] Int. Cl.³ .............................................. G06F 11/00
[52] U.S. Cl. .................................... 364/200; 364/900
[58] Field of Search ... 364/200 MS File, 900 MS File

[56] References Cited

U.S. PATENT DOCUMENTS 4,104,718  8/1978  Poublan et al. ................... 364/200
4,205,374  5/1980  Bardsley et al. .................. 364/200

Primary Examiner—Gareth D. Shaw
Assistant Examiner—Terence Flyntz
Attorney, Agent, or Firm—Herbert F. Somermeyer

[57] ABSTRACT

Direct access storage devices (DASD) are connected to a host via a cache. Each device can be independently addressed by any one of a plurality of addresses, also termed logical devices and exposures. Since operations between DASD and cache are combined for all of the independent logical devices, resetting operations related to one independent logical device can inadvertently interfere with operations of another independent logical device. To maintain data integrity, a programmed control accommodates logical device independence by using queues and control blocks relating to the DASD and logical devices, respectively.

5 Claims, 12 Drawing Figures

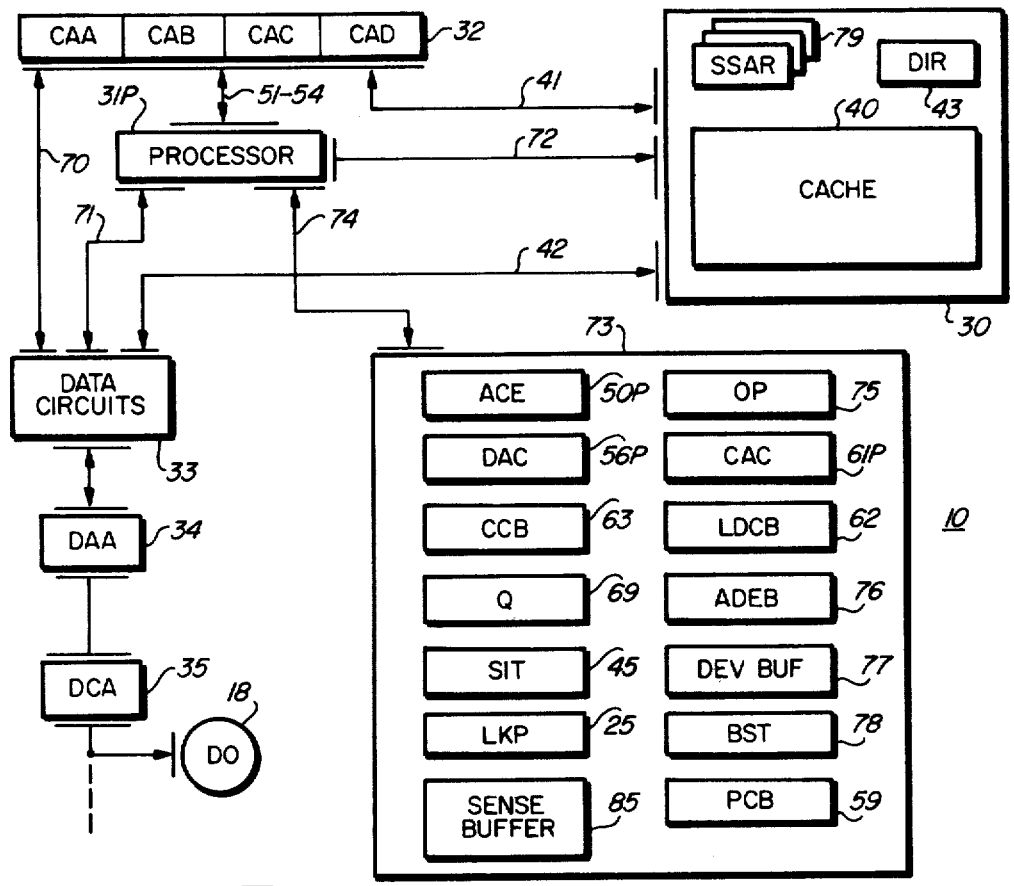
FIG-2
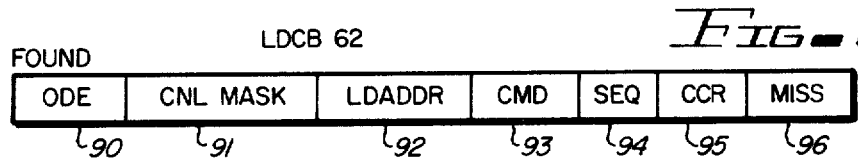
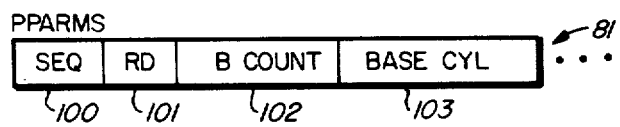
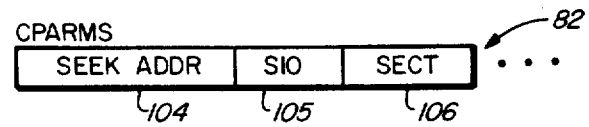
FIG-3

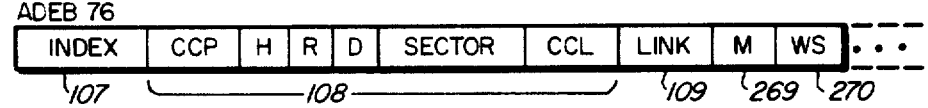
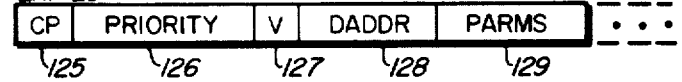
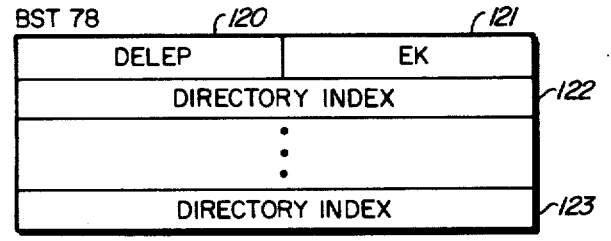
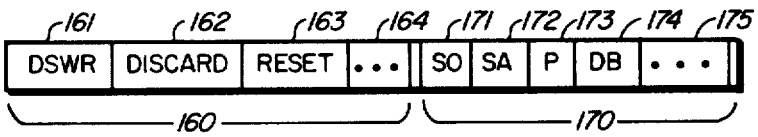
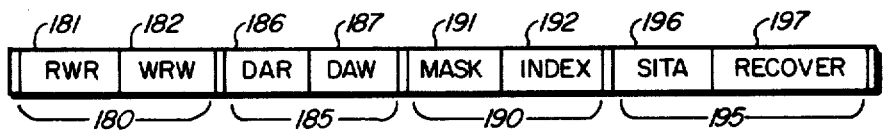
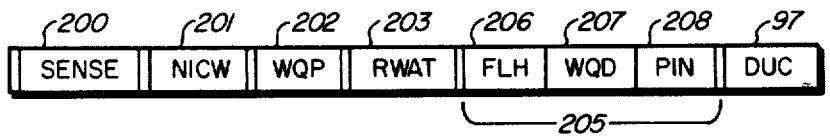
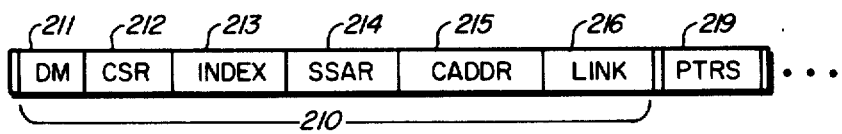
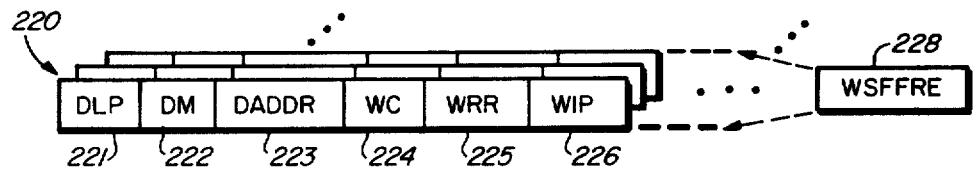
_FIG_4

METHODS AND APPARATUS FOR RESETTING PERIPHERAL DEVICES ADDRESSABLE AS A PLURALITY OF LOGICAL DEVICES

FIELD OF THE INVENTION

The present invention relates to data processing peripheral systems and more particularly to controls for such systems for selectively resetting peripheral devices to a predetermined reference state.

BACKGROUND OF THE INVENTION

The cooperative relationship between data processing host systems and attached peripheral systems, including peripheral data storage systems, requires the exchange of control signals for ensuring system and data integrity. Included in such control are resetting capabilities. A host system can send a reset peripheral command to a peripheral system for reestablishing a predetermined operational state within one or more devices of the peripheral system. Such resetting is useful for error recovery purposes, as well as recalibration and the like. In general, two types of resets may occur in a peripheral system. Firstly, a so-called selective reset is performed through input/outout channels or connections. When certain peripheral device/peripheral systems malfunctions are detected, a selective reset enables the input/output channel to signal the device connected to the channel to reset to a predetermined restartable operational state. Secondly, a system reset occurs when the host system performs an internal reset, an initial program reset, system clear reset or a power on reset. The peripheral system reset causes the input/output connection to conclude operations on selected channels and subchannels connected to such host. Devices are selectively reset in accordance with the type of reset command. Status information contained in subchannels as well as interruption conditions are reset. The peripheral system responds by resetting all devices and operations relatable to the input/output channel that supplied the system reset signal. It should be appreciated that because of the diversity of peripheral systems and peripheral devices that the particular reset operation can vary widely. A common requirement is that the peripheral system and device each reset to a predetermined restartable or reference operational state. In some situations, a selective reset may effect only the peripheral device without affecting a control unit that is usually interposed between the host system and the peripheral device.

In most peripheral systems each peripheral device is addressable through a single unique address, i.e. while access may be multipath, the device is always uniquely defined in the system. Certain paging and swapping peripheral systems employ a plurality of addresses for each peripheral device. Each of the addresses for the physical device can be termed an "exposure"; also referred to as a "logical device" of the peripheral system. Each logical device will have its own unique address; preferably that unique address is easily relatable to the physical peripheral device. The peripheral system preferably employs an addressing scheme and control such that each logical device is independent of the other logical devices. This arrangement results in a plurality of diverse operational states for a single peripheral device; one unique operational state for each of the logical devices used to access the physical device. Further, a peripheral system can combine operations for the single physical device from all of the logical devices. Such combination, particularly work queues, can raise the efficiency of the peripheral system and hence reduce access time as well as cost of operations.

When resetting a logical device, such reset to a restart position should not affect the other independent logical devices. When common work queues and accesses to a single peripheral device from a plurality of logical devices occurs, the reset may be inadvertently propagated to other logical devices through the commonality of the operations. In a peripheral storage system, a cache memory may be employed in connection with a backing store having a retentive storage properties, such as a direct access storage device (DASD) which usually includes disk storage apparatus. The data in the cache is accessible through any of the logical devices. Accordingly, controls must be implemented to ensure that resetting a given logical device does not inadvertently remove or alter access to data stored in the cache that is intended for another logical device.

SUMMARY OF THE INVENTION

It is an object of the present invention to facilitate resetting selected logical devices from a plurality of logical devices while simultaneously maintaining recoverability of operational status for any logical device that is inadvertently affected by resetting any of the logical devices, including controls for such operations.

A machine implemented method of the invention operates a peripheral system having a plurality of addressable devices with each addressable device being addressable via any one of a plurality of addresses as a corresponding plurality of individual independent logical devices. An intermediate control unit coupled to a host system and to all of the addressable devices relays signals between the host system and any of the addressable devices via any of the logical devices through any one of a plurality of host system input/output connections. The peripheral system independently receives data transfer requests from the input/out connections for each of the logical devices; a plurality of logical devices occur for each single physical addressable device. Preferably, but not necessarily, all of the received data transfer requests (usually in the form of received peripheral or input/output commands) are sorted into work queues in accordance with the addressable physical devices. Data transfers between the addressable devices and their intermediate units are independent of the logical device addresses. A single logical device is reset which includes terminating any data transfers currently occurring between the intermediate unit and the addressable storage device indicated in the reset command. After resetting a logical device, all of the other logical devices associatable with the addressed logical device through the shared physical device are examined for possible inadvertent reset activity. This examination is preferably achieved through the use of a control block which identifies each of the logical devices and its corresponding operational state. When the reset has inadvertently affected operations of another logical device, those affected operations are indicated as being completed even though such operations were interrupted and cancelled. The effect of this anomalous indication on the peripheral system is that the interrupted operation in fact did not occur thereby enabling a retry from the beginning of the interrupted operation. On a subsequent request by the host system relating such interrupted-reset operation results in the peripheral system asking the host system to restart the operation for the other inadvertently affective logical device. In this manner recovery is achieved from inadvertent resetting. The work queues are affected for the addressed logical device by deletion of all entries associated with such logical devices but leaving all entries relating to logical devices not included in the reset command.

In a system reset, all logical devices having an allegiance or other operational association to the input/output connection transmitting the reset command are reset as if separately addressed. Such logical devices may be associated with a plurality of physical peripheral devices; this indicates that any inadvertent transmission of the reset function may affect the entire peripheral system. Recovery from such reset propagation is provided.

The foregoing and other objects, features, and advantages of the invention will be apparent from the following more particular description of the preferred embodiments of the invention, as illustrated in the accompanying drawings.

DESCRIPTION OF THE DRAWINGS

FIG. 2 is a block hardware diagram of the FIG. 1 illustrated system.

FIG. 3 illustrates a control block for a logical device used in connection with the FIG. 1 illustrated system.

FIG. 4 illustrates data structures of a paging control block, logical port and directory control for use in connection with operating the FIG. 1 illustrated system when practicing the present invention.

DETAILED DESCRIPTION

Figure 1:
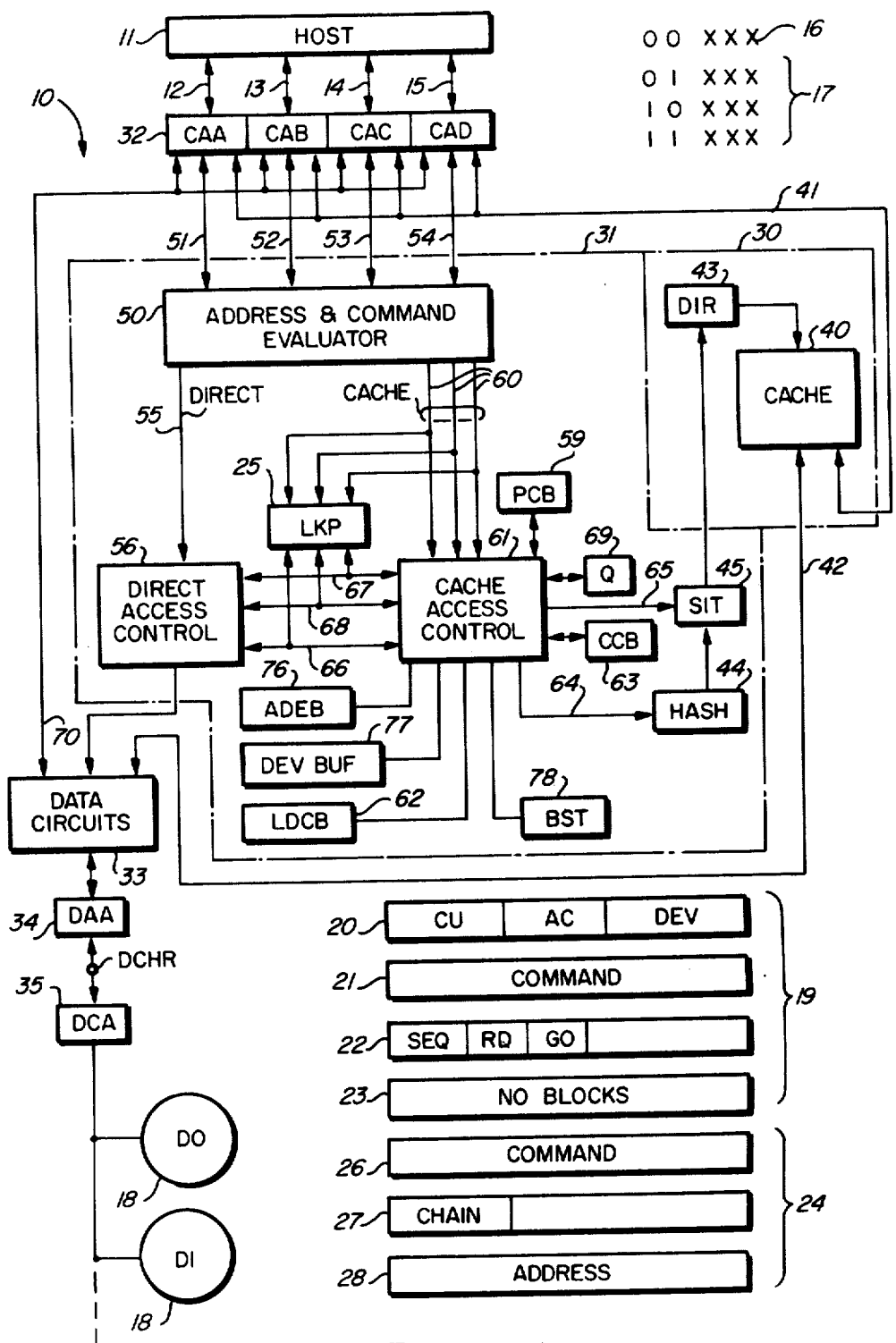
FIG. 1 is a block diagram of a peripheral system employing the teachings of the present invention together with command structures and addressing structures used therewith.

Referring now more particularly to the drawing like numerals indicate like parts and structural features in the various diagrams. A hierarchical peripheral storage system 10 is attached to a host 11 for receiving and supplying data signals for host utilization. In a typical application of storage system 10, host 11 consists of a central processing unit (CPU). In other variations, host 11 can be a virtual machine, a set of virtual machines running on a hardware CPU. Host 11 may also be a multi-processor, a uni-processor with attached processors and the like. While the invention can be applied to a great variety of storage systems 10, the preferred and illustrated embodiment shows a paging peripheral storage system for handling paging and swapping data sets. Generally, such paging and swapping data sets relate to storage of program data sets for host 11. As such, storage system 10 is attached to a single host while a general application peripheral storage system can be attached to a plurality of hosts. The invention can be applied to either type of peripheral storage system.

Communications between storage system 10 and host 11 are via a plurality of input/output connections 12–15 which are constructed in accordance with the input/output peripheral channels of the IBM 370 series of computers available from International Business Machines Corporation, Armonk, New York. Such input/output connections, commonly referred to as channels and subchannels, are so well known their description is not necessary. Storage system 10 has a lower or backing storage portion consisting of a plurality of direct access storage devices (DASD) 18 and separately enumerated D0, D1, . . . . All accessing of data and storage of data by host 11 with respect to peripheral storage system 10 is by addressing DASDs 18, hereinafter termed devices. This addressing is achieved by using the architecture of the input/output connections 12–15 which are summarized in a set of logic blocks 19. Logic blocks 19 represent a channel command word (CCW) as used in the channels for the IBM input/output connections. Typically each channel command word 19 includes an address byte 20. Each address byte 20 includes a plurality of bits for designating the control unit (CU) which is to receive the command. A second plurality of bits DEV uniquely identify the devices 18 to be accessed. In a paging and swapping peripheral storage system 10, each of the devices 18 is provided with a plurality of logical device addresses, i.e. device D0, for example, can be addressed by any one of four addresses. Such multiple addressing has been practiced in the IBM 2305 paging storage system to a limited degree. The logical addresses for each devices 18 are indicated in the bits AC of address byte 20. Accordingly, AC has two bits for indicating which of the four logical addresses are being used by host 11 to address a device D0. In the presently constructed embodiment, one of the logical addresses 00 designates a direct access to devices 18. That is host 11 operates with devices 18 as if peripheral storage system 10 were not a hierarchical system; all the hierarchy is by-passed for direct access. For the AC bits being equal to 01, 10 or 11, the hierarchy, later described, is accessed for obtaining data from devices 18 or supplying data to those devices such that the apparent performance of those devices is enhanced on those three logical device addresses. The abbreviation AC is intended to indicate access path (logical) to the device indicated by bits DEV.

A second byte of CCW 19, command byte 21, contains a code permutation signifying to peripheral memory system 10 what function is to be performed. A third byte 22 is a command modifier type having a plurality of control fields which electrically indicate to peripheral storage system 10 various modes of operation for executing the command indicated in byte 21. In the paging mode (AC=01, 10 or 11), the bit pattern SEQ received from host 11 indicates to peripheral storage system 10 that the data to be transferred in an upcoming set of transfers (usually read-type transfers) will be sequential data. When SEQ portion of byte 22 indicates sequential data, then the additional command modifier byte 23 is included in the CCW 19 for indicating the number of blocks or segments of data which will be transferred from devices 18 to host 11, or in the reverse direction, as a sequential set of data. Such sequential sets of data in a paging environment are often referred to as swapping data sets. Additionally, byte 22 can indicate read and discard in section RD which means that once host 11 obtains data from the hierarchy, that data in the hierarchy cache can be discarded; the data in the devices 18 is retained. Further controls are provided by so-called "guest operating system" GO. In a virtual computer environment for host 11, one of the operating systems can have cognizance of the paging peripheral storage system 10. Access to peripheral storage system 10 can be handed over to another operating system for accessing or storing data. Such other operating system is a guest of the first operating system and hence is not allowed to modify certain control aspects of the peripheral storage system. Other control fields are also used within byte 22 which are beyond the present description of the illustrated embodiments.

The hierarchy includes a system storage 30 of the semiconductor random access type which has a portion 40 designated as a cache for devices 18. Caching principles are sufficiently well known that the purposes and intent of cache 40, with respect to devices 18, need not be detailed. A control 31 receives the peripheral commands from host 11 for accessing devices 18 through one of the logical device addresses AC as well as providing access to cache 40 based upon any three logical device addresses of AC. Data is automatically transferred by peripheral storage system 10 between cache 40 and devices 18. These transfers are achieved using the same principles of data transfer as used between host 11 and devices 18. Host 11 accesses devices 18 in a direct mode (AC=00) via channel adaptors 32, individually denominated CAA, CAB, CAC and CAD, then over bus 70 through data circuits 33, device adaptor 34 and device control attachment DCA 35. Received CCWs 19 are interpreted by control 31 for determining the direction of data flow between host 11 and devices 18, as well as other functions. The relationship of cache 40 to devices 18 is substantially identical to the relationships between host 11 and devices 18. That is, while host 11 provides control via a series of CCWs 19, control 31 provides access between cache 40 and devices 18 by using a plurality of internal command words (ICW) which are structured in a similar manner to the CCWs, as will become apparant. Certain efficiencies and transfers of operation can be provided by altering the ICWs 24 with respect to the CCWs 19. Instead of going through the channel adaptors 32, control 31 has a cache access control CAC 61 which operates system storage 30 and provides access control DAC 56 using ICWs 24. Instead of channel adaptors 32, a linkage port LKP 25 provides for transfers between CAC 61 and DAC 56. LKP 25 is described later with respect to FIG. 3.

Each ICW 24 includes a command byte 26 similar to command byte 21; some ICW command bytes relate to storage system 10 functions not commanded by any CCW command byte. It should be appreciated that the code permutations for identical commands may be the same. Some additional commands are provided while some of the commands for byte 21 are dispensed with. A command modifier byte 27 includes a chain control bit "CHAIN" which replaces the chaining indication normally provided by host 11 to control 31 via channel adaptors 32. (The chaining indication by host 11 is the supplying of a SUPPRESS OUT tag signal.) When final status is due to be reported by peripheral storage system 10 to host 11; SUPPRESS OUT indicates chaining, i.e. an indication of a series of closely related peripheral commands as is fully described and used in connection with the input/output connections 12-15. Since CAC 61 does not use tag signals, command modifier byte 27 is used to replace that tag control signal. For Set Sector and Seek commands, field 28 of each ICW 24 points to the stored location within control 31 of the data address in the devices 18. Address byte 28 relates to device 18 control on Seek and Set Sector commands, such as cylinder address (C), the head or track address (H) and on Search commands the record address (R). The record address corresponds to a sector address (rotational position) used in addressing most disk storage apparatus. In a preferred embodiment, four records were provided on a single track (H address); hence the record address is 1, 2, 3 or 4 corresponding to an effective orientation of 0°, 90°, 180° and 270° of the disk with respect to a reference rotational point. Design parameters may dictate actual rotational orientations that may differ from the effective orthogonal orientations. ICWs 24 use only physical addresses; all logical devices addressing has been converted to the physical addresses. Cache 40 transfers data signals through channel adaptors 32 with host 11 via bus 41. In a similar manner, data signals are transferred between devices 18 through data circuits 33 to cache 40 via bus 42. When simultaneous transfers between cache 40 and host 11 or DASDs 18 are not desired, buses 41 and 42 are combined into a single bus time shared by the data transfers. Accessing cache 40, which can be a relatively large memory (several megabytes) requires CAC 61 to transfer the device address together with cylinder and record addresses CHR over bus 64 to hash circuit 44. Hash circuit 44, which may be microcode implemented, converts the DASD address into a hash class indicator. Since the storage capacity of cache 40 is much less than devices 18, the address range of devices 18 are concentrated into classes called hash classes for ease of access. A scatter index table SIT 45 has one register for each of the classes defined by hash circuit 44. The contents of the registers in SIT 45 are address pointers to a directory DIR 43 which contains the address DCHR used to access data in cache 40 from devices 18. When data is stored in cache 40, the DASD 18 DCHR address together with the cache 40 address is stored in a so-called entry of DIR 43. Since a plurality of device 18 addresses correspond to one hash class, a singly-linked hash class list is provided in the entries of DIR 43 such that scanning cache 40 using hasing only requires scanning the entries within a given hash class. Based upon the contents of directory 43, cache 40 is accessed using known techniques. If no related entries are found in directory 43, then a miss occurs requiring CAC 61 to either allocate space in cache 40 for receiving data from host 11 or to transfer data from devices 18 using ICWs 24 and linkage port LKP 25.

Control 31 includes the usual portion of peripheral control units that attach to hosts. For example, address and command evaluator ACE 50 communicates with channel adaptors 32 via buses 51, 52, 53 and 54 for receiving command signals from host 11 and supplying status signals to host 11. ACE 50 evaluates CCWs 19 and instructs the peripheral memory system 10 to perform the commanded function as well as indicating the chaining conditions and receiving status signals from the other portions of the peripheral system for relaying to host 11. In a direct mode, i.e. AC=00, ACE 50 supplies command signals over bus 55 to DAC 56 such that data signals can be transferred between data circuits 33 and the appropriate channel adaptor 32 using known DASD peripheral storage device techniques. In executing its functions, DAD 56 exercises control over data circuits 33 in the usual manner.

ACE 50, when receiving a logical device address in byte 20, indicating access to the hierarchy, supplies the received command signals over one of the three buses 60 to CAC 61. The three buses are logical buses indicating the respective cache 40 accesses. CAC 61 stores the received command and modifier data in a channel control block register CCB 63. DAC 56 and CAC 61 later access CCB 63 to obtain this information for command execution.

Each logical device is defined by a logical device control block LDCB 62. Remember there are three logical device addresses for each of the devices. Therefore, if there are eight devices 18, then there will be 24 control blocks LDCB 62. The identification and operational status of each logical device is kept in a respective one of logical device control blocks LDCB 62. Access to a logical device, which is represented by allocation of registers in cache 40 to the address indicated in fields AC and DEV of byte 20, is via address bus 64 to hash circuit 44. When CAC 61 receives a miss indication from searching the hash class of DIR 43, a request for a data transfer from a device 18 to cache 40 is supplied over bus 66 to DAC 56 via LKP 25. The bus 66 signal alerts DAC 56 to the request and indicates the ICWs are now addressable via LKP 25. In the preferred microcode embodiment, LKP 25 is a microcode linkage port, as will become apparent. DAC 56 responds to the ICWs 24 in the same manner that it responds to the CCWs 19. Upon completion of data transfers, as requested through LKP 25, DAC 56 supplies status signals over bus 67 to CAC 61. At that time, cache 40 has data available to host 11. Further communications between CAC 61 and DAC 56 are via bus 68, all such communications including storing message data in LKP 25. Because devices 18 are accessed through a plurality of logical device addresses, a set of queuing registers 69 queue device-related operations requested by CAC 61. In this manner, DAC 56 may not be concerned with the queuing requests through the logical devices but can operate in a direct-access DASD mode for either host 11 and for CAC 61. In this manner, DAC 56 cannot only be used in connection with the hierarchy, but can be used in those peripheral storage systems not employing a hierarchy.

CAC 61 also includes additional controls, for example, register ADEB 76 contains one entry of directory 43 with which CAC 61 is currently operating. That is, the address of a device 18 resulted in a hit in cache 40 or a portion of cache 40 was allocated to data to be supplied by host 11; by placing the entry in register ADEB 76, operation of CAC 61 is enhanced. That is, directory 43 is a part of system storage 30; by placing the active entry in ADEB 76, system storage 30 is free to transfer data over buses 41 and 42 independent of control 31. Device buffer (DEV BUF) registers 77 contain control information relating to a device 18 and are used by CAC 6 in setting up device accesses through DAC 56. Such registers are found in a writable control store in the microcoded implementation of the invention. Buffer 77 is merely an allocated portion of control store with no designated data structure. BST 78 is a buffer sequence table described later with respect to FIG. 4. PCB 59 is a paging control block used for controlling paging operations involving cache 40 as described in FIG. 4. It includes pointers to directory 43 for each of the data blocks to be transferred in a sequence of data blocks over bus 42 as well as a scanning control mechanism for determining which directory index is to be used for accessing cache 40 during a sequential data transfer. In this manner, a sequential transfer can dispense with addressing setups such that a burst of blocks from a device 18 can be made without interruption.

FIG. 2 is a block diagram of a preferred embodiment of the FIG. 1 illustrated system which employs a programmed microprocessor 31P corresponding to control 31. Bus 70 extends from channel adaptors 32 to data circuits 33 and operates in an identical manner as shown for FIG. 1. Buses 41 and 42 extend respectively from channel adaptors 32 and data circuits 33 to system storage 30. Buses 41 and 42 may be combined into one bus with data transfers time sharing the single bus. Processor 31P in controlling the transfer between data circuits 33 and system storage 30 provides control signals over bus 71 to circuits 33 and address and sequencing control signals over bus 72 to system storage 30. A plurality of system storage address registers SSAR 79 provide addresses to system storage 30. For example, 8 or 16 SSARs 79 may be provided. Therefore, when processor 31P accesses system storage 30, not only does it give the address of the system storage 30 to an SSAR 79 but indicates which of the SSARs is to be used in accessing the storage. Multiplex addressing registers to a memory are known and therefore not further described.

For each of the burst of sequential data blocks, processor 31P prime system storage 30 by loading the addresses of cache 40 (a portion of subsystem storage 30) within an SSAR such that the address need not be loaded in SSAR 79 intermediate the successive sequential blocks. The number of SSARs 79 receiving addresses equals the number of data blocks to be transferred in the sequence of data transfers. During the actual sequential data transfer, processor 31P merely refers to an SSAR for initiating the transfer of data signals between cache 40 and a device 18. It should be noted that cache 40 has a given address space within system storage 30. In a similar manner, directory 43 has a different range of addresses. SSARs 79 are separate electronic registers outside the memory array of system storage 30. Processor 31P communicates with channel adaptors 32 over a single bus denominated as 51–54 which corresponds to the four buses 51, 52, 53, 54 of FIG. 1.

Operation of processor 31P is in accordance with microcode programs stored in control store 73 which is preferably writable, although a portion can be writable while another portion containing certain programs can be read-only. Bus 74 couples the processor 31P to control store 73. Within control store 73 are programs ACE 50P which implement the function of address and command evaluator 50, DAC 56P which implements the functions of direct access control 56, CAC program 61P which implements the functions of cache access control 61 and OP 75 which are other programs relating to storage system 10 but which are not necessary to an understanding of the present invention. The registers used by processor 31P to control the system 10 via the programs 50P, 56P and 61P include CCB 63, LDCB 62, queue registers 69, ADEB 76, SIT 45, buffer 77, PCB 59, LKP 25 and BST 78. For an extremely large cache 40, SIT 45 can be stored in system storage 30. To enhance performance, a set of registers for containing a page of SIT 45 can be reserved in control store 73.

Operation of the FIG. 2 illustrated and preferred embodiment is best understood by reference to FIGS. 3 through 12 which illustrates the data structures in detail as well as machine operation diagrams for the microcode portions necessary for an understanding of the operation of the present invention. FIG. 3 illustrates the data structures used by a processor 31P to operate storage system 10 using logical devices. LDCB 62 is a series of registers containing data signals in control store 73 consisting of four sections. A first section 80 is a so-called foundation data structure which defines and supports the functions of storage system 10 in a general operational sense. Pparms 81 is that portion of LDCB 62 relating to the parameters defining a paging and swapping function established through a later described set paging parameters peripheral command. Cparms 82 contains the command parameters such as set sector, seek, search ID command issued by host 11. These commands are those used in connection with known disk storage apparatus peripheral storage systems. Rparms 83 contain the parameters for supporting read activity; i.e. transferring data signals from devices 18 to cache 40.

The foundation portion 80 includes bit ODE 90 which signifies whether or not a device end (DE) is owed by peripheral storage system 10 to host 12. CNL mask 91 contains a bit pattern indicating which channel adaptor 32 received the current command, i.e. which channel the logical device has an affinity or allegiance to. LDADDR 92 contains a code permutation indicating a logical address received with the command, i.e. the bit patterns of AC and DEV of byte 20 in FIG. 1. CMD 23 contains the code permutation from byte 21 of FIG. 1. SEQ 94 contains the contents of SEQ section of byte 22 of FIG. 1. CCR 95 indicates whether a channel command retry has been sent to host 11 by storage system 10. In this regard, when a cache miss is indicated in section 96, a channel command retry was sent to host 11. Therefore LDCB 62 signifies when a miss has occurred for cache 40 and whether or not system 10 has supplied the appropriate CCR signal. Channel command retry merely signifies to host 11 that a delay in executing the peripheral command is required. System 10, upon reaching a state in which the command can be executed, will send a device end (DE) signal to the host. The host then sends the peripheral command for the second time such that the command can then be executed by system 10.

Pparms 81 include a sequential bit SEQ 100 corresponding to the sequential bit SEQ in byte 22 as well as the RD indicator 101 from RD section of byte 22. B COUNT 102 contains the number of blocks from byte 23. As each block of the sequential data is transferred to host 11, B COUNT 102 is decremented by one. Therefore, it indicates the number of blocks yet to be transmitted to host 11 through cache 40. This number is used upon the next cache miss as on indication of the number of data blocks to be moved from a device 18 to cache 40. BASE CYL 103 contains the cylinder address C of a virtual machine (VM) minidisk; this field is valid only when the host has indicated to storage system 10 that a guest operating system may access a device 18. Cparms 82 contains the DASD seek address in SEEK ADDR 104, the last or current search ID argument in SIO 105 and the last or current set sector value in SECT 106.

Rparms 83 includes REQD 110 indicating that a data transfer from a device 18 to cache 40 is required. RIP 111 indicates that a read is in progress from a device 18 to cache 40. RA 112 indicates that a read has been completed from a device 18 and that certain post-processing functions are being performed. DADDR 113 contains the bit pattern of DEV from byte 20 (FIG. 1) for indicating the actual device 18 being addressed. DIR INDEX 114 contains a directly 43 index value for indicating which directory entry register contains the entry corresponding to the logical device identified in the particular LDCB 62 register. SSAR 115 identifies which SSAR 79 will be used in accessing cache 40 in a data transfer between a device 18 and cache 40. SAVE 119 indicates an area of the LDCB 62 registers which processor 31P uses to save control data signals during various operations, including interruption operations. For scheduling read operations, read queue (not shown) is established for each device. Each read queue is a FIFO (first-in first-out) list of requests for access to data in the respective devices 18.

FIG. 4 shows ADEB 76, which is structured in the same way that each entry of directory 43 is structured. Accordingly, description of ADEB 76 amounts to a description of directory 43. In each entry of directory 43 as well as ADEB 76, INDEX 107 is the logical address of the directory entry. This field contains self identifying data for each entry. Section 108 contains the address of devices 18 corresponding to the data stored in cache or allocated for storage. CCP is the physical cylinder address, i.e. the actual physical address of the cylinder for a device 18, H is the head (disk surface) address, R is the record address, P is the device address bit pattern corresponding to DEV section of byte 20, sector is the actual sector value, i.e. rotational position of the disk near which Search ID, then reading will begin. The R value for tracks having four records can vary from one to four while the sector value is the actual sector address. In addressing DASD, the R value is translated into a rotational position indicator at the byte level as in usual DASD addressing techniques. The R value in some host operating systems can range from 1–120 or other numbers; in such cases the larger R values stored in ADEB 76 used in addressing are reduced to a value, modulo the number of records, N, in a track. Then the R value, modulo N, is converted to a rotational address of the disk. Such sector value is suitable for initiating access to a record with a minimal latency delay. CCL is the logical cylinder address such as provided for logical devices which are defined on physical devices. Link 109 contains the data signal code permutation of the singly-linked list for linking all entries of a hash class together. The last entry of a given hash class will have a particular code pattern (zeroes) indicating end of chain or end of class. M bit 269 indicates whether or not the data in cache 40 has been modified since it was received from a device 18. Other code permutations can be added to ADEB 76 and each directory 43 entry and which are not pertinent to an understanding of the present invention; for example, an MRU-LRU list may be included.

LKP 25 is an area in control store 73 accessible by programs ACE 50P, DAC 56P and CAC 61P which make up a linkage port or message area for controlling the interaction of the execution of these microcode units. In one embodiment, ACE 50P and DAC 56P were treated as one code segment such that LKP 25 was accessed by those two microcode sections as a single unit. In any event, the structure of the port includes a code point CP 125 which identifies the portion of the code which lodged the control data in the port. That is when CAC 61P lodges an entry in LKP 25, DAC 56P will fetch the control data and execute the function. Then, when DAC 56P enters new data in LKP 25 responding to the request by CAC 61P, CP 125 indicates to CAC 61P which point in code execution the DAC 56P relates to for continued processing based upon DAC 56P response. Priority section 126 contains code permutations indicating whether the request lodged in LKP 25 is high priority, low priority or a continued processing indication. V bit 127 indicates whether or not LKP 25 entry is valid, i.e. is it a recent entry requiring action. DADDR section 128 contains the DEV code permutations from byte 20 for identifying which device 18 is associated with the current LKP 25 control data signals. PARMS 129 contain various parameters associated with the message, i.e. what function is to be performed, status and the like.

BST 78 has a set of registers for each of the device 18. A first register includes section DELEP 120 which contains an index value of 1 to 8 pointing to the directory indices 122-123. These indices identify the directory 43 entries to be deleted. It is also used as an address; for example, the first directory 43 pointer index is always stored in 122 while the 8th one is always stored at 123. For a value of 3 in DELEP 120, a third directory index is accessed. Directory index, remember, is a logical address of a directory 43 entry, hence is a rapid access into directory 43. EK 121 contains a count of the number of valid entries in the table.

Paging control block PCB 59 is detailed for showing the data structure which support the paging communication and parameter storage for implementing paging functions effected through cache 40. Numeral 160 denotes so-called global flags which are control flags widely used within storage system 10 when paging is active. DWSR 161 indicates a restart is required for writing to a device 18 as a result of storage system 10 receiving a reset command. Discard 162 indicates that all data in cache 40 is to be discarded. Reset 163 indicates that a reset command has been received. Ellipsis 164 indicates that additional global flags may be used in a storage system 10 but which are not pertinent to an understanding of the present invention.

Flags 170 relate to dispatching tasks within processor 31P. Task dispatchers are well known and are not shown or described for that reason. The flags used in dispatching paging-related tasks as may be related to resets include SO bit 171 which indicates that an LDCB 62 entry includes delayed status owed to a host system 10 for the corresponding logical device. During a reset such delayed status is erased when the reset is directed toward the given logical device or maintained when the reset is not directed to such given logical device. SA 172 indicates that an addressable slot (storage space) for a block of data is available within cache 40. P bit 173 is a read/write priority indicator controlling the direction of data transfers between cache 40 and device 18. A zero indicates that data transfers from device 18 to cache 40 have priority over transfers in the reverse direction. A binary one indicates that data transfers from cache 40 to device 18 have priority over transfer in the reverse direction. DB 174 indicates that a discard block command has been received from host system 10 and is currently being executed, i.e. one block of data in a given slot of cache 40 is to be discarded. Ellipsis 175 indicates additional control flags may be used in connection with dispatching paging functions. Work queue flags 180 indicate status of the work queues for their respective devices. RWR 181 contains a number of bits equal to the number of devices 18. A one in any of the bits indicates that read work (transfer of data from device 18 to cache 40) has been queued for the device corresponding to the bit position within the read work queue. WRW 182 is similar but indicates work queues for writing (transfer of data from cache 40 to a device 18).

Numeral 185 denotes device allocation flags which contain flags indicating whether a device 18 is currently allocated for read or write work. Flags 185 are interrogated in pairs, one from DAR 186 and one from DAW 187 (respectively read and write allocations); one pair of bits for each device 18. When the pair of bits are both zeros, the device 18 is not allocated for either read or write; a zero-one value indicates the device 18 is allocated for write; a one-zero indicates that the device is allocated for read and a one-one indicates that the device is being directly accessed corresponding to the AC value of zero-zero. These flags indicate availability of a device 18 for executing work indicated in the work queues.

Device read queue distributor 190 guarantees that even distribution of read activity plus across later described read queues. Mask 191 is a device bit-significant field corresponding to the read queues which are to be interrogated next for read operations. This is a load balancing indicator. Index 192, within a value range of the number of devices 18, identifies which particular device 18 that is to be accessed next for scheduling work to be done.

Directory 43 management control fields 195 enable directory recovery action as well as normal directory processing. SITA 196 contains the address of SIT 45 entry corresponding to the data block of interest. Recovery portion 197 includes a set of flags enabling recovery. Included are flags indicating that a hash update is required, that data structures within the directory require updating and that the addressed slot in cache 40 needs recovery. Sense 200 is the data control structure used in connection with presentation of sense of status data to the host relating to error and operational conditions for the physical devices 18. NICW 201 contains bit significant flags for each of the physical devices 18 indicating which ICW chains have not yet been restarted; a bit being one indicates that the corresponding physical device 18 has such a chain. WQP 202 points to a write queue element currently having a write scheduled flag being cleared and dequeued or may be in the process of being placed on a pinned list and is being dequeued (pinning means related data stored in the cache 40 will not be transferred to device 18). The entry is merely a pointer to the write queue entry. RWAT 203 is a read work allocation table which has an entry for each of the device 18 read queues. Each entry includes a pointer to the first cache slot and the next cache slot plus pointers to three logical device work slots. This table controls the assignment of read activity to guarantee that the read activity is processed in the same order that the requests were received from host system 12. This aspect is important because when host system 12 wants to recover from an error condition, it can only maintain the recovery if the storage system 10 can report the error conditions in a relationship to the sequence that the host system 12 used in supplying the read requests.

Numeral 205 denotes a write queue control having three portions. FLH 206 is a free list leader which has a pointer to the top of the device write free list which is a tabulation in control store 73 of all the free entries which are available for allocation as write queue entries. WQD 207 is a write queue distributor which guarantees an even distribution of write activity across the device write queues. WQD 207 is constructed similarly to read queue distributor 190 which includes a bit significant mask corresponding to the write queue to be next interrogated for writing service and an index which identifies the particular device 18 that will be serviced next. Pin 208 is a device activity indicator for controlling the removal of entires on the device pin list due to successful completion of a read or write operation or the occurrence of a change in device 18 status. The field is a bit significant field in accordance with the devices 18.

The actual write queue entry is denoted by numeral 210. Entry 210 includes device mask DM 211 which is a bit significant field identifying the address by bit position within the byte of the device 18 associated with the entry. This mask is an image of the mask 222 in device write queue header 220. CSR 212 contains the internal device addressing of the record including cylinder, sector and record number as well as the head address. Index 213 is the index to directory 43. SSAR 214 contains the address of the storage address register 79 which will access cache 40 for upcoming device 18 related operations. CADDR 215 contains the address of the slot in cache 40 containing the block. Link 216 is a link field for linking the entires together in a predetermined order. Pointers 219 include pointers for the block being subjected to paging operations for LDCB 62 and to the read queue associated with block being subjected to paging operations.

Write queue header 220 is a set of registers associated with writing activity assigned to the various devices 18. Each register contains several fields which are used to control the structure of the device 18 write queues. Each register includes a doubly-linked pointer system DLP 221 using the usual doubly-linked pointer construction. DM 222 contains the device mask mentioned earlier. DADDR 223 contains the identification of the device 18. WC 224 is a work count to indicate the number of requests in the write queue 210. WRR 225 is a single bit indicating that a write restart is required as a result of a reset. WIP 226 indicates that a writing operation is currently in progress.

Figure 5:
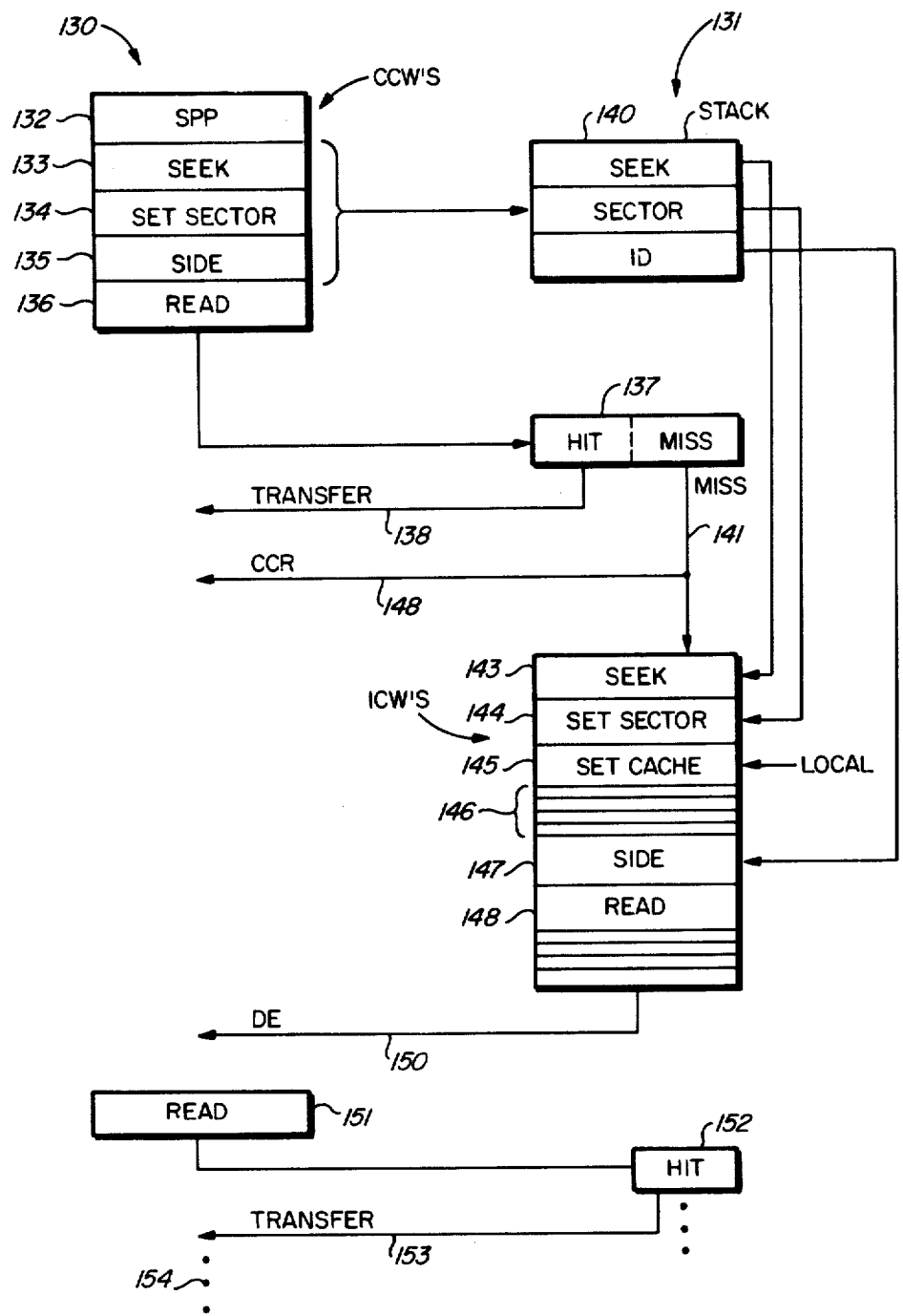
FIG. 5 illustrates a data transfer function of the FIG. 1 illustrated system.

FIG. 5 illustrates a sequence of CCWs and ICWs for a read or write data transfer. In a direct access mode (AC=00), a read transfer transfers signals from a device 18 directly to host 11, while a write transfer is a data transfer in the reverse direction directly to an addressed device 18. In a paging mode (AC=10, 01 or 11) a chain of CCWs 130 begins with set paging parameters (SPP) CCW 132. SPP 132 causes storage system 10 to set whether or not sequential data is to be transferred from peripheral storage system 10 to host 11, as well as other parameters identified in byte 22 of CCW 19 (FIG. 1). Once SPP has indicated parameters of operation to storage system 10, a seek CCW 133 results in a seek command being transferred to the peripheral storage system; in one embodiment the seek parameters were embedded in the SPP command. Using normal DASD architecture, seek is followed by optional (in paging mode, AC=01, 11 or 10) set sector CCW 134 (the corresponding set sector ICW24 is generated within storage system 10 as will become apparent) which in turn is followed by a search ID equal (SIDE) 135. Now storage system 10 is ready to read data from an addressed device 18 by read CCW 136. Upon receipt of the read command, peripheral storage system 10 provides the action indicated in column 131. First of all, the seek, set sector and search ID equal commands are stacked as at 140. At 137 a directory 43 search, as explained with respect to FIG. 1, is conducted. For a hit, i.e. the requested data is in cache 40, the data is immediately transferred as indicated by arrow 138 from cache 40 to host 11 via the channel adaptor 32 which received the command. On the other hand, if directory 43 indicated the data was not in the cache, then a miss has occurred as indicated at arrow 141. A channel command retry (CCR) is supplied by system 10 as indicated by arrow 142. This action tells host 11 that when a signal is received from storage system 10, that the read command of CCW 136 must be again sent by the channel to storage system 10. While this is occurring, storage system 10 constructs a chain of ICWs 143-148 beginning with a seek ICW 143 which is derived from the stacked commands received from host 11. For a multitrack operation, the ICWs are derived from search ID parameters. The seek ICW 143 is followed by a set sector ICW 144 which has a sector value calculated from the record number. At 145, the CAC 61 input results in a set cache ICW 145. This ICW causes DAC 56P to insert into the appropriate SSAR 79 the address of system storage 30 at which the data to be read will be stored. If a plurality of blocks of data are to be transferred, then a plurality of set cache ICWs occur, as indicated by numeral 146. Then a search ID equal ICW 147 corresponding to the SIDE CCW 135 occurs. The search ID equal ICW 147 corresponds to the first set cache ICW 145. This means a plurality of blocks of data are read in sequence using but one SIDE ICW 147. Then a number of read ICWs 148 commands equal to the number of data blocks to be transferred are given to DAC 56P for reading a predetermined number of blocks of data indicated by the number of set cache ICWs. Upon completion of the read, which transfers data from the addressed device 18 to cache 40 at the addresses set in SSARs 97, system 10 supplies a device end (DE), as indicated by arrow 150, to host 11. Host 11 immediately responds by reissuing a peripheral command at 151 corresponding to the CCW 136. Of course, system 10 searches directory 43 at 152 resulting in a hit because of the just executed ICW chain. Data is then transferred from cache 40 to host 11 as indicated by arrow 153. In the event that the data was not transferred for the requested data block at 136, another miss will occur; then a CCR (channel command retry) is given to host 11. This CCR reflects the fact that system 10 was unable to transfer data from the addressed device 18. Host 11 then retries the command; if the retry is unsuccessful, host 11 then can use the direct access (AC=00) for attempting recovery using standard disk storage apparatus recovery techniques beyond the scope of the present description. Ellipsis 154 indicates that the above-described operation is repetitive as well as indicating that various CCW chains for various devices 18 can be interleaved. The ICW chains do not necessarily follow the sequence of chains of CCWs. Depending upon the circumstances, an ICW chain may be constructed and used by a later occurring CCW chain. Such possibility indicates the asynchronous aspect of the ICW chains with respect to the CCW chains. Usually, the first CCW chain will result in a first occurring ICW chain. At any instant, a separate ICW chain can be active for each device 18.

Figure 6:
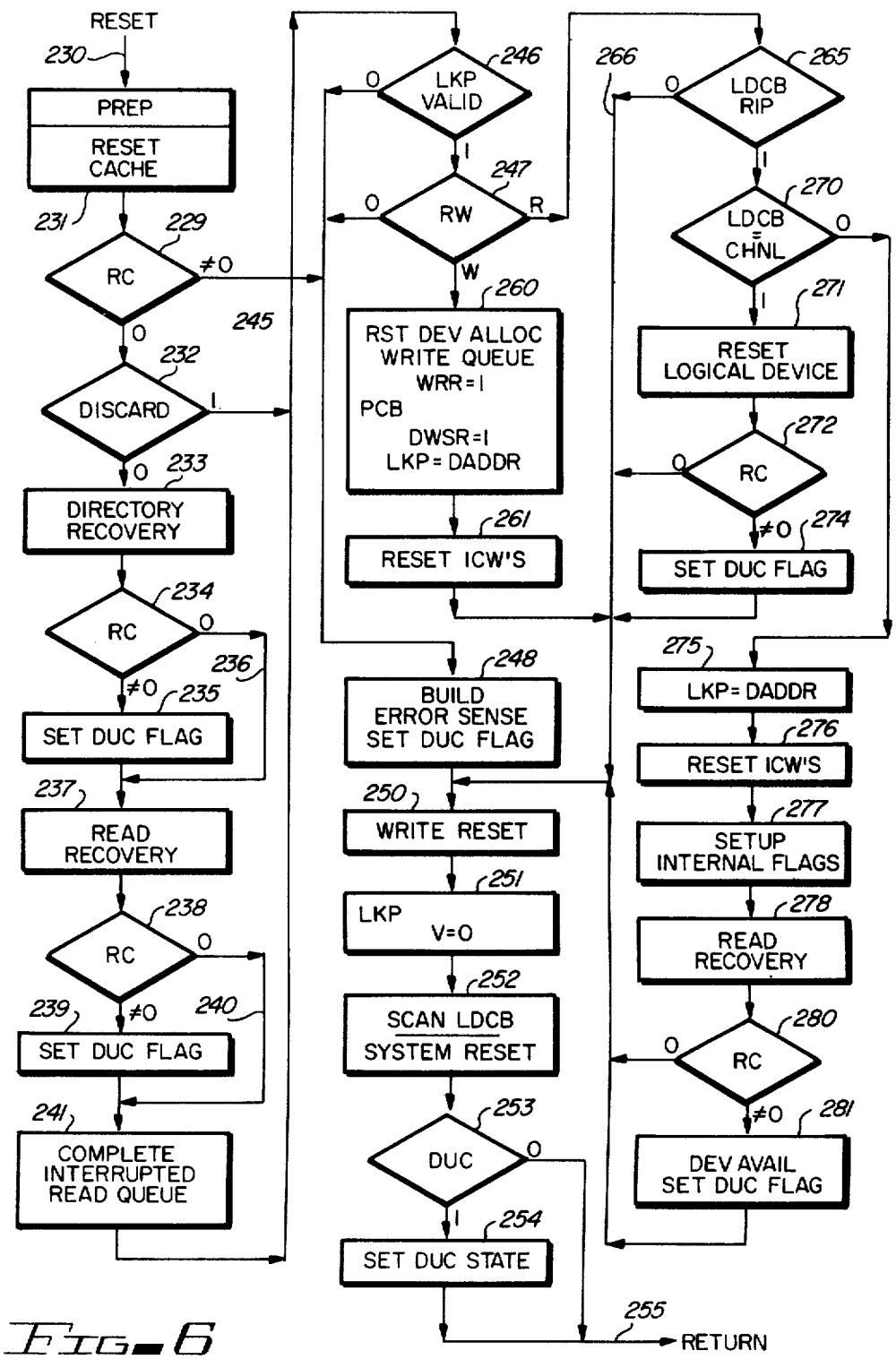
FIG. 6 is a machine operations chart of the FIG. 1 illustrated system showing resetting a logical device.
Figure 7:
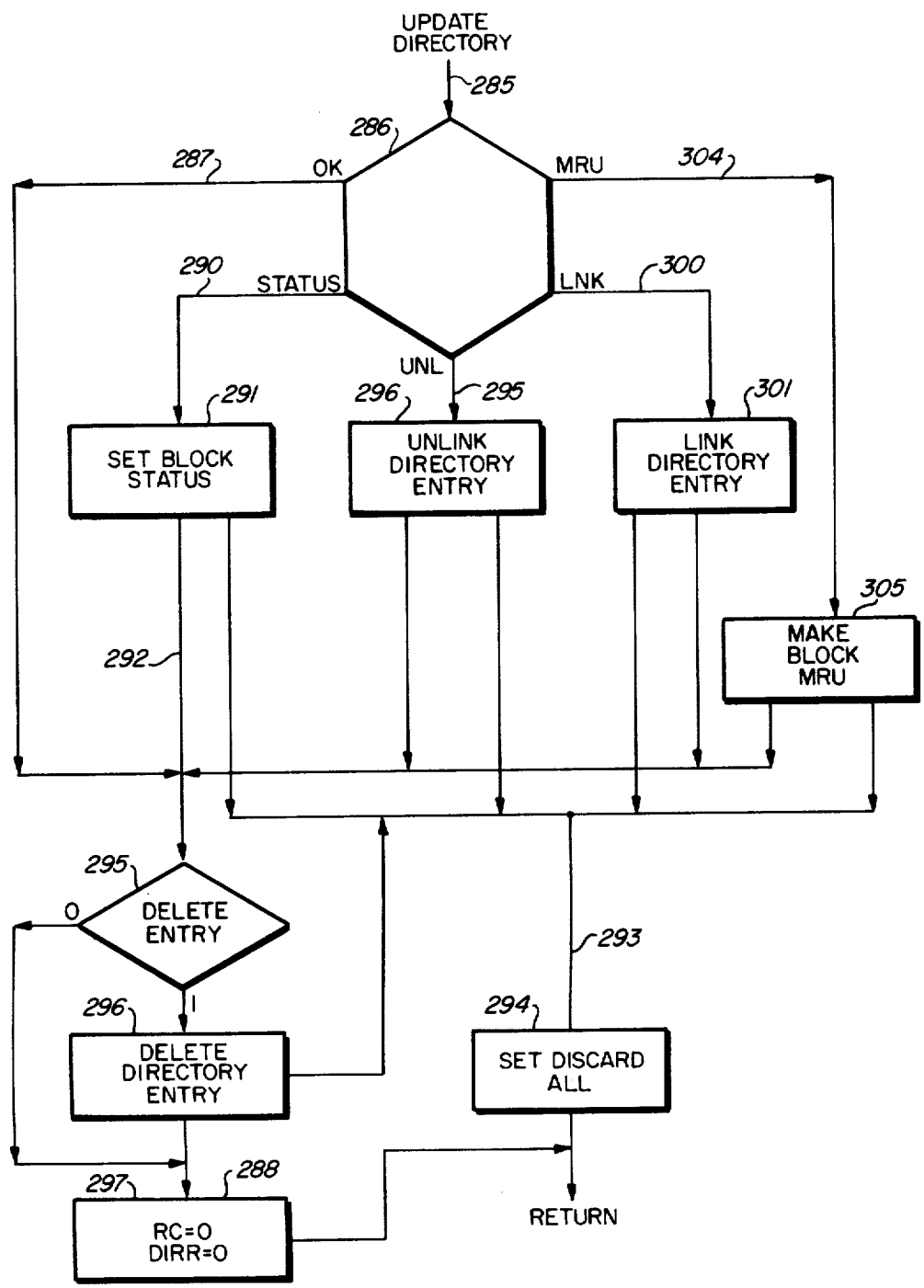
FIG. 7 is a machine operations chart of the FIG. 1 illustrated system showing updating an intermediate unit cache memory directory as a result of a logical device being reset.

FIG. 6 shows the action of DAC 61 following receipt of a decoded reset command supplied to it from ACE 50. Machine operations begin at 230 by the receipt of the reset command from ACE 50. At 231 preparatory actions are provided. These include fetching global flags 160 from PCB 59 (FIG. 4) and setting reset bit 163. The sense data associated with system storage 30 are reset (a sense buffer 85 in control store 73 of FIG. 2 is reset). Cache 40 is also reset. At 229 the return code from resetting cache 40 is checked. Following an error free cache reset, processor 31P at 232 examines the discard all flag 162 of PCB 59. If the discard all flag is set, then processor 31P proceeds to later described machine operations via junction 245. If the discard all flag is off, which is the usual case, if the directory 43 was in the process of being updated when the reset was received, recovery from this state is made at 233 as detailed in FIG. 7. In other words, directory 43 must reflect the latest operations that were completed just prior to receiving the reset such that the status of the storage system 10 is precisely reflected by the directory 43 status. Processor 31P at 234 then examines the return code provided by the FIG. 7 illustrated machine operations. A return code RC of not zero indicates that an error condition occurred during updating directory 43. An error in directory 43 operations causes processor 31 to set discard 162 of global flags 160 in PCB 59 such that the cache 40 contents are discarded. At this time processor 31P at 235 sets a deferred unit check DUC 97 into PCB 59 (FIG. 4). Remember the reset is directed to a logical device; the reset will be reflected to all accesses hence. DUC 97 is in PCB 59. Accordingly, the DUC 97 is set in PCB 59 (FIG. 4) for that addressed logical device. If at 234 the directory 43 recovers from the reset (RC=0) successfully, then processor 31P follows logic path 236 to read recovery at 237. The successful operation of read recovery is checked by processor 31P at 238 by checking the return code RC. If an error condition occurred (RC≠0), then DUC 97 is set at 239. For an error free reset (RC=0), processor 31P follows logic path 240 directly to step 241 wherein any read dequeue operation interrupted by the received reset is completed. Then processor 31P proceeds through logic path 245 to perform the next described machine operations. At 247 if no valid read or write operation was being performed or at 246 if LKP has no valid entry (V=0), at 248 sense data is accumulated (built) which indicates an error. DUC 97 of PCB 59 is set for enabling storage system 10 to report this error to host 11 at the next slot.

The next functions performed involve verifying the status of the corresponding device 18 including accessing LKP 25 to determine if the valid bit V 127 (FIG. 4) is set to the active condition. This means that a valid entry is in LKP 25. When this is the case, processor 31P at 247 examines Pparms 81 (LDCB 62) to determine if a read or write operation was being performed.

If the Pparms 81 indicate a read operation, then steps 265 et seq, later described, are performed. For a write operation indicated in LKP 25, processor 31P performs reset operations related to a write or recording operation. At 260 device allocation flags for the addressed device in section 187 of PCB 59 are reset. Write queue header 220 for the addressed device is accessed to set WRR 225 to unity for indicating a write restart is required. In global flags 160 DWSR 161, the global flag related to a write restart is also set. LKP 25 receives the device address DADDR for the device 18 related to logical device receiving the reset command. Then at 261 the ICW chain is reset such that any action in connection therewith will require a complete restart as indicated by the just set flags and accomplish the resetting function desired by host system 12.

For a read mode indicated in LKP 25 at 247, processor 31P at 265 examines LDCB 62 Rparms flag RIP 111 to determine if a read is in progress. If not, then logic path 266 is followed to perform some reset functions later described which are performed for all conditions of LKP 25. For a read in progress, processor 31P at 270 examines LDCB 62 to see if CNL MASK 91 matches the channel adaptor 32 over which the reset command was received. If not, no further action with respect to the given LDCB need be accomplished, i.e. the reset does not apply to the logical device indicated by the present control block. For equality the reset does apply to the logical device. Then, at 271 processor 31P resets the logical device as explained in detail with respect to FIG. 11. At 272 the return code from resetting the logical device is checked for error conditions. For a return code of zero, logic path 273 is followed to indicate no error condition. For a nonzero return code at 272, a deferred unit check DUC 97 of PCB 59 (FIG. 4) is set to the active condition. DUC 97 is a memory flag for processor 31P to enable reporting the error conditions upon the receipt of the next start IO (SIO) from host system 11. Then processor 31P proceeds via logic path 266.

When the LDCB 62 does not coincide with the channel receiving the reset command, processor 31P at 275 puts the DADDR corresponding to the device 18 into LKP 25. At 276 the ICW chain is reset; at 277 internal control flags are set up to indicate ICW processing was interrupted by the received reset and that a logical reset (LOGRST) was not being performed. At 278 the read reset operations are activated as described later with respect to FIG. 12 which includes dequeuing the interrupted read request from the work queue and freeing any resources (cache or device allocation) committed to such read request. Completion of the read reset operation is checked at 280 for an error free return code of zero. Logic path 266 is followed to the system control steps 250 et seq. For an error condition, processor 31P at 281 sets DUC 97 of PCB 59 for the addressed logical device.

Figure 9:
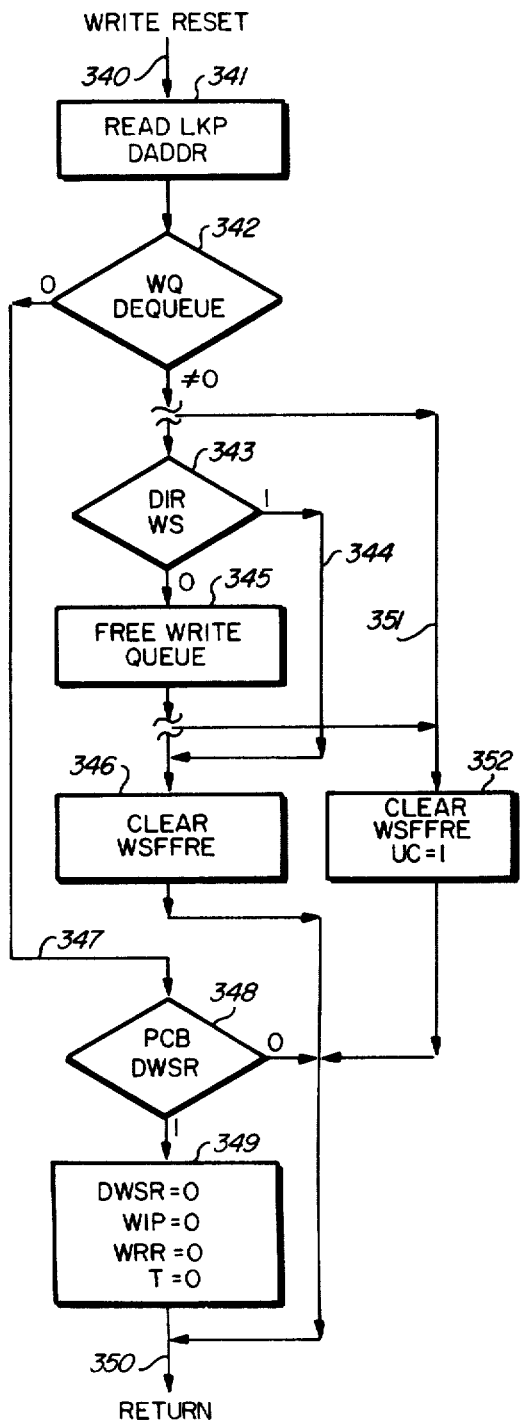
FIG. 9 is a machine operations chart showing a reset operation of a logical device as it effects a write operation to a peripheral device in the FIG. 1 system.

The system control functions of the reset machine operations being at 250 which performs a write reset for device 18 as described with respect to FIG. 9. At 251 the LKP 25 indicator V127 is reset to zero. At 252 the LDCB's 62 for all logical devices are scanned as described with respect to FIG. 10 to find any unintended propagation of the reset to other logical devices, i.e., which of the LDCB 62 entries should be reset. FIG. 9 shows the machine operations relating to the above-mentioned systems reset. Then at 253, DUC 97 is examined; if DUC 97=1, then at 254 status relating to the unit check is assembled for reporting to host 11 at the next S10. At 255 processor 31P returns to its dispatcher (not shown or described since it is a usual dispatcher for programmed machines).

FIG. 7 illustrates the machine operations relating to recovering directory 43 congruence after receipt of a reset command. The directory 43 has to be placed into a so-called congruent state whenever a cache related function is interrupted by a reset or while directory 43 is being updated. Two levels of updating are provided. A first level is performed before a second level. First level ensures that the individual directory 43 entries residing in ADEB 76 of control store 73 or in system storage 30 are valid. These entries may become invalid as a result of a reset occurring while data is being transferred between control store 73 and system storage 30 which leaves the entry in a partially updated incongruent state. Any directory 43 updating during normal operations results in a recovery parameter flags (not shown) being set in control store 73. Upon completion of the updating the recovery parameter is cleared. These flags (not shown) are used in connection with the FIG. 7 illustrated machine operations. During the updating of the directory following a receipt of a reset command, processor 31P first examines the recovery indicator. When the recovery indicator is on, processor 31P retrieves the saved updating parameters from control store 73 and restarts and completes the interrupted updating of directory 43. A second level of reset recovery ensures congruency among elements of the various data structures. Obviously, this can only operate after the first level of recovery has been completed because integrity of directory 43 is a prerequisite to successful congruency.

The machine operations for updating directory 43 begins at 285. A five direction branch 286 is made dependent upon the recovery parameters of control store 73. If the directory is in a congruent state, then the ok branch to logic path 287 is followed to step 288 which sets the return code RC=00 and a directory recovery flag=00. The dispatcher is then returned to. The control store recovery parameters may indicate that the reset interrupted the identified machine operations. The cache block slot status may have to be changed. Accordingly, status logic path 290 is followed to 291 which sets the block status. The index which points to directory 43 entries is modified and written. Parameters indicating miscellaneous flags are set or cleared. A possible error condition can be checked with the error exit 293 being taken from setting a cache block status. Error exit 293 results in processor 31 setting the discard all flag 162 in global flags 160. Block status is changed by selectively deleting the appropriate directory 43 entry. That is, the entry in directory 43 may have been updated and the corresponding operation of writing to cache was not completed. Therefore, deleting such entry creates congruence between the directory and cache. At 295 whether or not the entry is to be deleted is checked. At 296 such noncongruent entry is deleted. For no deletion required, processor 31 goes from step 295 to create ending status (RC and DIRR=0) at 297. From step 297 return is made. Step 296 may result in detecting a logic error, hence processor 31 may take error exit 293 from this step.

When an unlink directory entry is required, logic path 295 is followed to step 296. The directory index contained in index 107 is fetched from ADEB 76. A backward pointer (not shown) in ADEB 76 is also fetched. If the backward pointer is null, then the contents of index 107 are stored. Otherwise, the entry of directory 43 pointed to by the backward pointer is read from directory 43. The forward pointer of the ADEB entry is then stored into the just described directory 43 entry. This action unlinks the ADEB 76 entry from the entry pointed to by the backward pointer. The additional process of unlinking from the forward pointer follows the same procedure. It is apparent to those of ordinary skill in the art that the above described unlinking operation is that found typical for unlinking any entry from a doubly linked list as manifested in link 109 of ADEB 76. This operation, of course, can result in an error condition resulting in an error exit at 293.

It may be appropriate to link the entry of ADEB 76 into the directory 43 link list. This action is initiated by processor 31P following logic path 300 to execute step 301 which links the directory entry into the directory 43 links via modifying the link field 109 of two entries linking an entry into a doubly linked list such as found for hash classes in directory is well known and not further described for that reason. Further, the block of data represented by the contents of ADEB 76 should be made MRU (most recently used). In this instance, processor 31P follows logic path 304 to step 305 which makes the indicated block most recently used. Most recently used and least recently used doubly linked list are well known that they are not further described. Such lists are used in connection with replacement algorithms for controlling the space of cache 40 using known replacement techniques.

It is seen that the recovery parameters of control store 73 set up whenever directory 43 is to be updated results in successful updating the directory upon the receipt of a reset command which interrupts all processes in storage system 10. For example, whenever directory 43 is to be updated by a block to make it MRU, linked into a hash class, unlinked from a hash class or status of cache 40 block is being changed, that those parameters are used in the reset processing for making congruence of directory 43 with the actual operational status of storage system 10.

Figure 8:
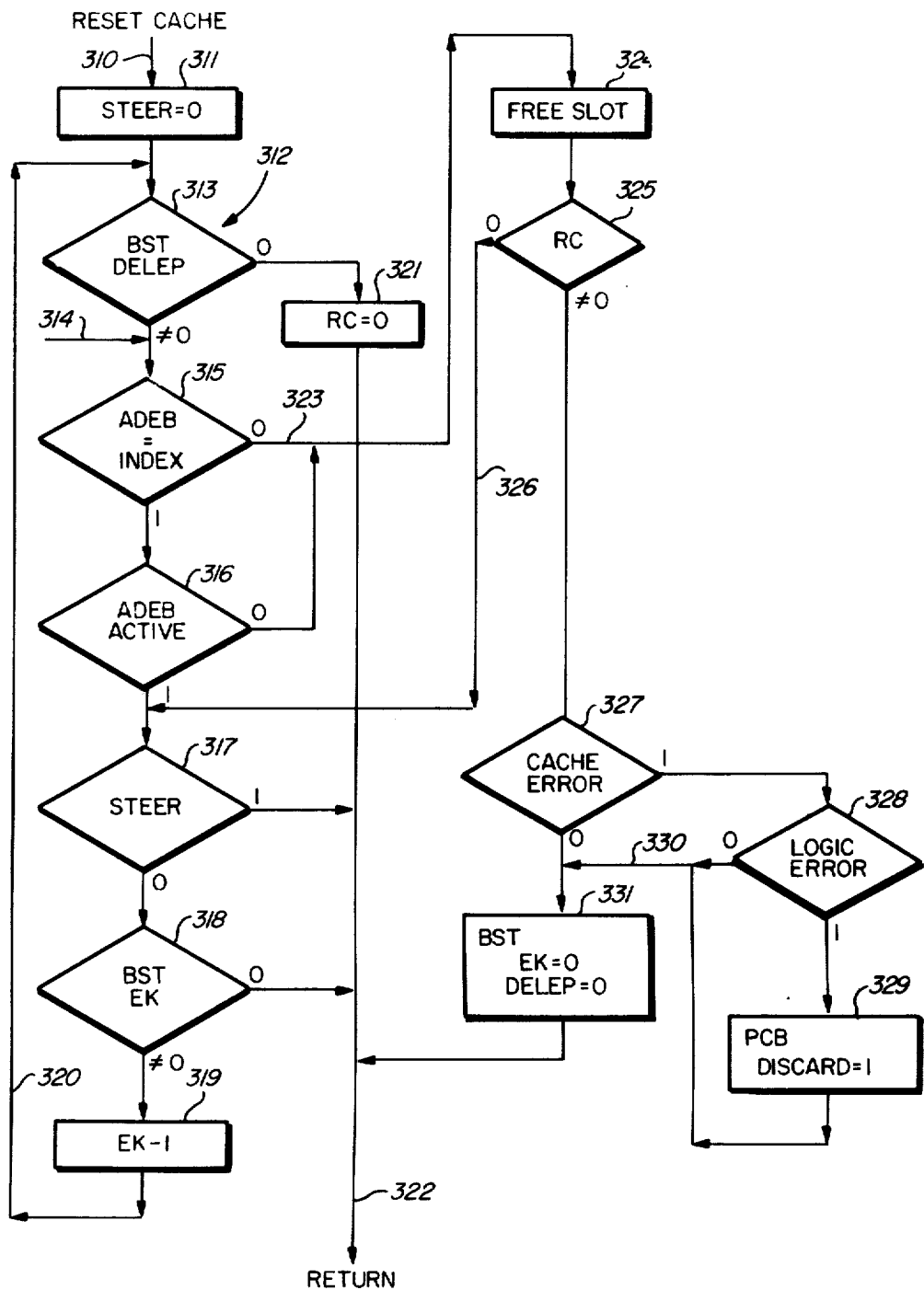
FIG. 8 is a machine operations chart illustrating operations of the FIG. 1 system relating to resetting a cache memory of an intermediate unit of a peripheral system during a reset of a logical device.

FIG. 8 illustrates the details of the step 237 recovery of allocated cache segments of FIG. 6 relating to the reset operations. These functions are shared by a plurality of machine operations. Accordingly, upon activation of the illustrated machine operations by processor 31P at 310 for a reset recovery, a steering flag (not shown) of processor 31P is set at zero at 311. The other entry into these machine operations is at 314 which does not require a cycling of the functions as required after a reset. Processor 31P executes loop 312 once for each directory index 122-123 of BST 78 (FIG. 4). First at 313, processor 31P examines BST 78 section DELEP 120. If the value is zero, then no addressable segments of cache 40 need to be processed. Accordingly, a return code of zero is set at 321 and return made at 322. For a DELEP 120 that is nonzero, processor 31P passes secondary entrance 314 to step 315 to determine if the directory index 122 is the same index as contained in ADEB 76 section 107. If the two are the same, then the index of BST 78 is pointing to the last active block of cache 40 such that at 316, processor 31P examines ADEB flags (not shown) to indicate whether or not a current storage or data transfer operation was occurring at the reset time with respect to the block indicated in ADEB 76. If this activity is current, then at 317 processor 31P examines the above described steering flag.

If the flag is one, then a single path of examination has been completed, allowing processor 31P to return to the dispatcher at 322. Else, the loop must be continued to ensure a complete scan of BST 78. Then at 318 processor 31P examines EK 121. If it is zero, all the work has been completed and a return to the dispatcher is made 322. Otherwise, it is nonzero and the EK 121 count is indexed at 319 by subtracting unity. The loop is closed through logic path 320 which leads to step 313 to repeat the loop until one of the branches indicates a loop exit.

Branch steps 315 and 316 can result in processor 31P following logic path 323 to step 324 which frees the slot of cache 40 corresponding to the block identified in the directory entry pointed to by DELEP 120 of BST 78. That is, the addressability of any data stored in cache 40 in the addressable area called "slot" is destroyed by erasing the directory 43 entry and unlinking that entry from its hash class, as is known in the memory art. Following freeing the slot, processor 31P examines the return code at 325. If the return code is zero, i.e. no error, then logic path 326 leads processor 31P back to loop 312 at step 317. If an error has occurred, then at 327 processor 31P determines whether or not it is a cache related error. If it is not a cache related error, it could be a logic (programming or logic circuit) error to be detected at 328. For a logic error the processor 31P knows that the integrity of directory 43 and of the data in cache 40 is suspect. Accordingly, PCB 59 is accessed to set discard 163 of global flags 160 to unity such that all the data in cache 40 is purged. Then following logic path 330, processor 31P joins the logic exit of step 337 to then perform step 331 which accesses BST 78 to set EK 121 DELEP 120 to zero. This action aborts the scan of BST 78 due to the just-detected error conditions. Return is made to the dispatcher (not shown) via logic path 322. The above described errors are suitably reported to host system 12 using known error presentation techniques.

FIG. 9 illustrates resetting the DASD write controls. Three different functions are performed depending upon the operational state of storage system 10 at the time of the reset. If LKP valid bit V 127 is active at the time of the reset, then the writing to DASD was aborted and the storage system 10 is now set up such that the aborted write can be reinstituted at a later time. This reset recovery is achieved by clearing WIP 226 of write queue header 220. There can be a partially postprocessed lock that had its write schedule WS 270 flag cleared and was removed from the write queue even through the writing to a device 18 had not been completed. In this case WSFFRE 228 enables retry of that partially completed write. Also, a partially post-processed block that was placed on a pin list for cache 40 could have been removed from the write queue 220. WSFFRE 228 is set before the block is actually planned to cache 40 and is cleared after the block is freed. In this manner WSFFRE is a coordinator for ensuring completion of these operations.

Machine operations chart of FIG. 9 begins at 340. At 341 LKP 25 is sensed for fetching the parameters and device address DADDR from LKP 25 into processor 31P. At 342 WSFFRE 228 is examined to see if it is zero. If the write queue entry was not dequeued, i.e. WSFFRE is not equal to zero, then after some error checking, processor 31P at 343 examines the write schedule flag WS 270 for the device 18 indicated by the DADDR fetched from LKP 25. If WS 270 is equal to zero for the device in question, then the write queue entry 220 for that device is freed, i.e. erased. Otherwise, that step is omitted. Then at 346 processor 31P clears WSFFRE 228.

Returning to step 342, if the write queue was cleared, then following path 347, processor 31P at 348 examines PCB 59, DWSR 161 to determine if a write restart flag of the global flags 160 is set. If restart flag is set, then at 349 DWSR 161 is cleared to zero, and WIP 226 and WRR 225 of the write queue entry 224, the device in question, are also cleared to zero. The device time out timer (not shown) for checking device 18 operations is also cleared. Then, processor 31P follows path 350 to the dispatcher; return is also achieved from steps 346 and 348.

Upon detection of an error condition between steps 342–343 or between steps 345–346, error path 351 is followed to step 352. Here processor 31P clears WSFFRE 228 and sets unit check (not shown) of the LDCB 62 to unity and invokes an appropriate error recovery procedure by setting suitable flags (not shown) and returns via path 350.

Figure 10:
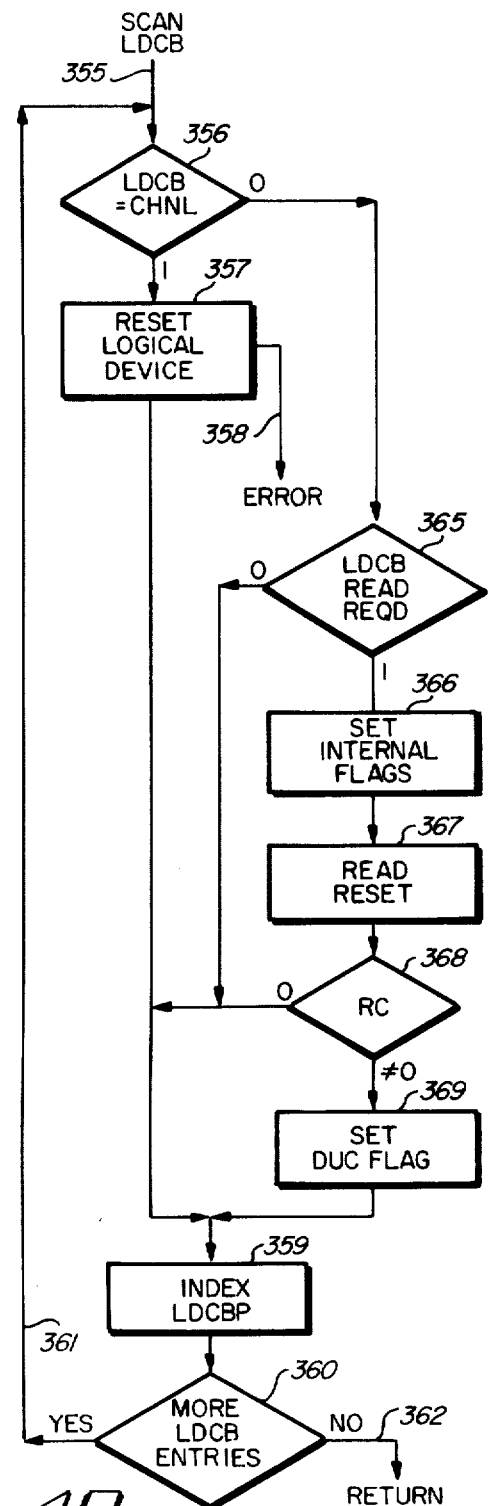
FIG. 10 is a machine operations chart illustrating a scanning control for scanning logical devices to check inadvertent propagation of resets in the FIG. 1 illustrated system.

FIG. 10 illustrates scanning the LDCB's 62 for determining which LDCB 62 entries are affected by the received reset command. The scan begins at 355 which corresponds to beginning of step 252 of FIG. 6. At 356 processor 31P examines LDADDR 92 of LDCB 62 and the LDADDR (not shown) stored in CCB 63. If the LDCB entry has the same logical device as determined by comparing CNL MASK 91 of the LDCB 62 entry with a channel mask received from ACE 50 with the reset command, then at 357 the logical device is reset as explained later with respect to FIG. 11. Possible error exit 358 can be followed as will become apparent. Then at 359, the pointer to LDCB 62 (LDCBP) is indexed by incrementing it by one. At 360 the completion of the scan is checked to see if the index is three (the number of logical devices for each real device 18) times the number of devices 18 in the storage system 10 (three logical devices per device 18); if not, logic path 361 returns processor 31P to entry point 355. If the scan is completed, return to the dispatcher occurs via logic path 362.

From step 356 processor 31P for those non-matching logical devices first executes step 356 by examining LDCB 62 for the logical device in question to see if a read from device 18 is required as indicated by REQD 110. If no read was required, then step 359 is executed to continue the LDCB scan. For a required read, processor 31P at 366 sets internal program flags (not shown) which controls flow of machine program execution in a usual manner. Then at 367 processor 31P performs a read reset as described later with respect to FIG. 12. At 368 the return code from the read reset is examined. If it is zero, a successful reset was accomplished. Accordingly, step 359 is executed. If the return code is other than zero, a unit check condition is apparent. Accordingly, at 369 deferred unit check (DUC 97) is set to the active condition. Then the scan is returned to via step 359.

Figures 11, 12:
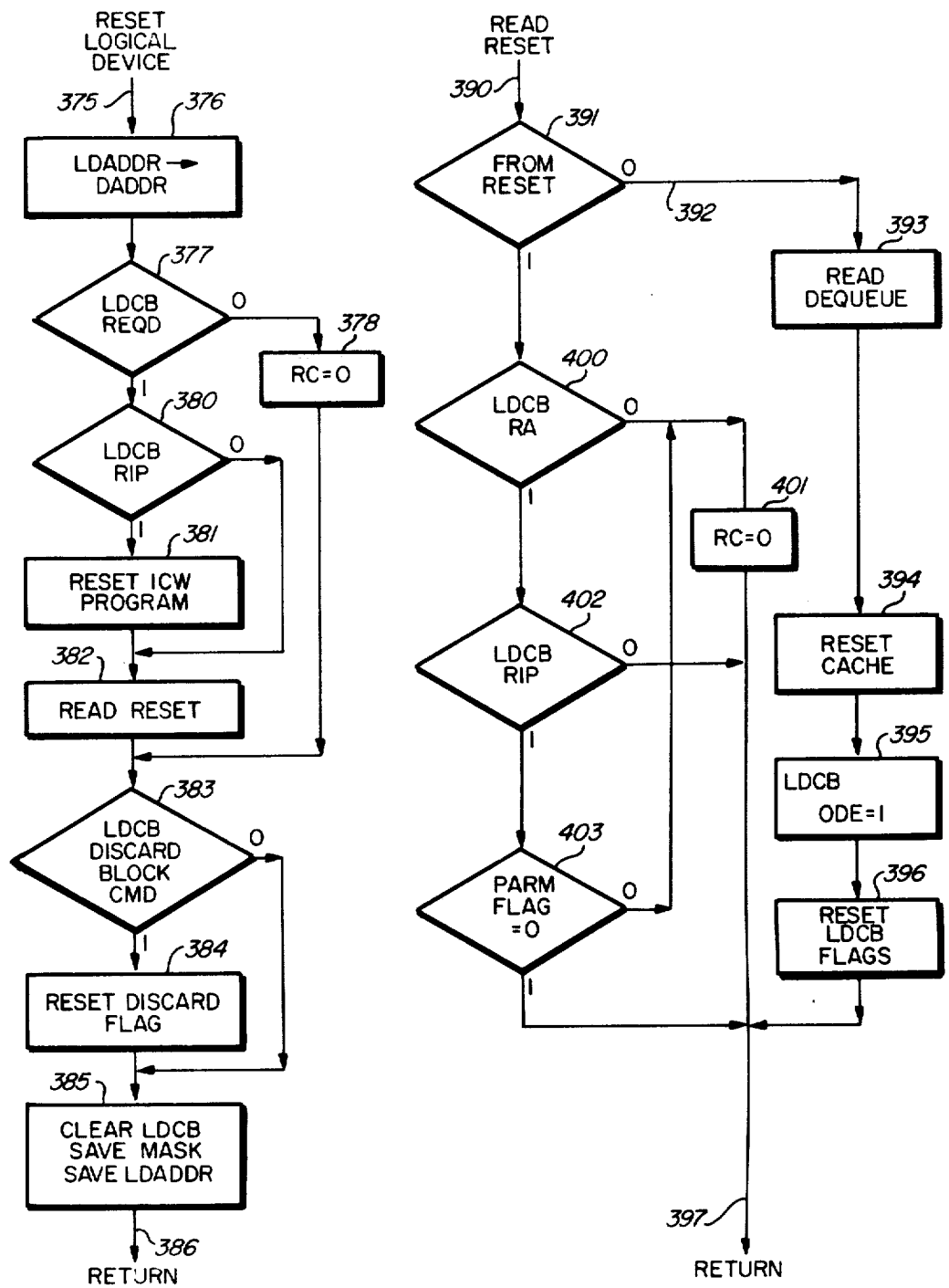
FIG. 11 is a machine operations chart illustrating resetting a logical device of the FIG. 1 illustrated system.
FIG. 12 is a machine operations chart showing resetting a read operation occurring in the FIG. 1 illustrated system.

The reset logical device machine-operations chart of FIG. 11 examines the LDCB 62 entry for a given device 18 such that when a read required flag REQD 110 of the LDCB 62 entry and the RIP flag 111 are set, the ICW program in progress when the reset occurred will also be reset. Next, if the LDCB entry has a discard block flag 174 of dispatcher flags 170, then, at 382 read reset actions are performed. Machine operations illustrated in FIG. 11 begin at logic path 375 such that at 376 processor 31P converts LDADDR 92 of LDCB into a DADDR (deletes the AC portion of LDADDR). At 377 REQD flag 110 is examined. If a read is not required, a return code of zero (clean status) is indicated at 378. If a read is required, at 380 the RIP 111 flag of LDCB 62 is examined. If no read was in progress at the reset time, then step 381 is omitted; for read in progress, the ICW program is reset to zeros. This enables a complete restart of a read operation interrupted by the reset. At 382 read reset of FIG. 12 is performed. Then at 383, LDCB 62 discard block command is looked for by examining command field 93. If that command has been received, the discard block flag 174 of dispatcher flags 170 is reset. Then at 385, LDCB 62 is cleared except for CNL MASK 91 and LDADDR 92. At 386 processor 31P returns to the dispatcher.

FIG. 12 illustrates the machine operations associated with the reset function for step 382 of FIG. 11. These machine operations continue resetting data structures for enabling restarting after the reset irrespective of the actual operational state of storage system 10. Accesses are made to PCB 59, LDCB 62 and LKP 25. The read reset begins at 390 such that at 391 processor 31P determines whether or not the illustrated machine operation was instituted from either a system or selective reset. For a reset operation, at 400 processor 31P examines the read active flag 112 of LDCB 62. If no read is active, at 401 the return code is set to zero and returns to the calling routine at 397. For a read active, at 402 processor 31P examines RIP 111 of LDCB 62. If no read was in progress at the time of reset, processor 31P returns to the calling routine at 397. Otherwise, at 403, LKP 25 is accessed to examine its stored device operation parameter flag (not shown). If the ICW V indicator was set to zero at reset time, i.e. the read command was not yet actually transferred to DAC 56.

For a logical reset, processor 31P follows path 392 from step 391. At 393 the read is dequeued from the read queues. This machine operation dequeues a read service request such as indicated by RWR 181 in section 180 of PCB 59. The work request to be dequeued is identified via LDCB 62 DADDR 113. In this manner any read can be dequeued. The queue work flag associated with the device is reset as found in the queue work flags 180. At 394, cache 40 is reset as described earlier with respect to FIG. 8. At 395 LDCB 62 is accessed such that ODE 90 is set to unity. At 396 the LDCB flags, except those associated with the channel of FOUND 80, are reset to zero. Return is then made via path 397.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of operating a peripheral system having a plurality of addressable devices, each device being addressable via any one of a plurality of addresses as individual independent logical devices; an intermediate unit coupled to all of said devices for relaying signals between any of said addressable devices addressed as a logical device and any one of a plurality of input-output connections of a host system;

the steps of:

for each logical device, keeping a control block, each control block having an electrical indication identifying and showing status of a peripheral operation associated with the respective logical device;

for each physical device maintaining a queue of operations to be performed for said plurality of individual logical devices;

receiving a reset signal from one of said input-output connections for a one of said logical devices including interruption of a current internal operation of said logical device, resetting operations indicated in said control block for said addressed logical device and for other logical devices;

scanning for an unintended effect of said interrupted internal operation, and if said interrupted internal operation unintentionally affects another logical device, indicate said internal operation of said another logical device as completed irrespective of its actual state of completion;

removing entries from said queues of operations, respectively, whereby retries of said unintended interrupted internal operations are enabled.

2. The machine-implemented method set forth in claim 1 further including the machine steps of;

identifying all logical devices having a status of peripheral operations relating to said one input-output connection;

stopping all current data transfers between said intermediate unit and of said physical devices related to said identified logical devices; and removing all entries from work queues for said any physical devices relating to said identified logical devices.

3. The machine-implemented method set forth in claim 1 or 2 wherein said intermediate unit has a data buffer for temporarily storing data being transferred between said host system and said addressable devices, further including maintaining data stored in said data buffer for all reset logical devices subject to replacement according to a predetermined replacement algorithm.

4. The machine-implemented method set forth in claim 1 or 2 further including for each of said addressable devices maintaining a first work queue for transferring data to said devices and a second work queue for transferring data from said devices; and for each received reset signal, removing entries from said first and second queues for each reset logical device.

5. The machine-implemented method of operating a peripheral system having a plurality of addressable storage devices, each said storage device being addressable via any one of a plurality of addresses as a plurality of individual independent logical devices; a cache coupled to all of said devices for relaying signals between any of said addressable devices addressed as a logical device and any one of a plurality of input-output connections of a host means, each said device and cache having a plurality of addressable segments of like data storage capacity;

the steps of:

independently receiving data storage commands from said input-output connections for said logical devices;

combining said received commands into separate work queues for said storage devices, respectively, such that data transfers between said cache and said storage devices are independent of said logical devices;

resetting one of said logical devices including terminating any data transfer currently occurring between said cache and a one of said storage devices accessible via said one logical device;

examining all others of said logical devices for possible data transfers, for each such possible data transfer from said one device to said cache indicate said possible data transfer as being complete and indicate no data from said possible data transfer as being in said cache, and removing all indicated data transfers from the work queue for said one device.

* * * * *